(12) United States Patent
Onishi et al.

(10) Patent No.: US 7,673,805 B2
(45) Date of Patent: Mar. 9, 2010

(54) MINI CARD ADAPTER

(75) Inventors: Masayoshi Onishi, Kyoto (JP); Yasuaki Wakizaka, Kyoto (JP); Yoshitaka Matsuda, Kyoto (JP); Koichi Ozaki, Kyoto (JP)

(73) Assignees: JCB Co., Ltd, Tokyo (JP); Maxell Seiki, Ltd., Kyoto (JP)

( * ) Notice: Subject to any disclaimer, the term of this patent is extended or adjusted under 35 U.S.C. 154(b) by 606 days.

(21) Appl. No.: 10/598,762

(22) PCT Filed: Mar. 10, 2005

(86) PCT No.: PCT/JP2005/004201

§ 371 (c)(1),
(2), (4) Date: May 11, 2007

(87) PCT Pub. No.: WO2005/088530

PCT Pub. Date: Sep. 22, 2005

(65) Prior Publication Data

US 2007/0278317 A1 Dec. 6, 2007

(30) Foreign Application Priority Data

Mar. 11, 2004 (JP) ............................. 2004-068547

(51) Int. Cl.
*G06K 21/00* (2006.01)
(52) U.S. Cl. ........................................ 235/486; 235/489
(58) Field of Classification Search ................. 235/486, 235/489, 490, 487
See application file for complete search history.

(56) References Cited

U.S. PATENT DOCUMENTS

| | | | | |
|---|---|---|---|---|
| 5,677,524 A | * | 10/1997 | Haghiri-Tehrani | 235/492 |
| 5,831,256 A | * | 11/1998 | De Larminat et al. | 235/486 |
| 6,009,315 A | * | 12/1999 | De Larminat et al. | 455/558 |
| 6,065,681 A | * | 5/2000 | Trueggelmann | 235/487 |

FOREIGN PATENT DOCUMENTS

| | | |
|---|---|---|
| JP | 8329206 | 12/1996 |
| JP | 10272872 | 10/1998 |
| JP | 2002190004 | 7/2002 |

* cited by examiner

*Primary Examiner*—Daniel St. Cyr
(74) *Attorney, Agent, or Firm*—Brooks Kushman P.C.

(57) ABSTRACT

A mini card adapter for removably holding and fixing a mini card in a secure manner is provided. The mini card adapter holds a mini card having the same thickness as the standard card and outline dimensions smaller than those of the standard card. The mini card comprises a reference wall having the same thickness as the standard card and a bulging section formed on the top surface of the reference wall. In the reference wall, a card pocket for is formed for loading therein the mini card. The land section is formed in a region corresponding to the emboss section of the standard card, and a part of the land section bulges over the card pocket. As a result, an eaves wall for supporting one side of the mini card is formed. The eaves wall has a boss which fits in a hole formed in the mini card. A receiving nail for receiving the periphery of the mini card in corporation with the eaves wall is provided on the peripheral lower surface of the card pocket.

6 Claims, 5 Drawing Sheets

MINI CARD ADAPTER

TECHNICAL FIELD

The present invention relates to an adapter designed for mounting a mini card whose exterior dimensions are significantly smaller than an ATM card or a credit card commonly used today. An object of the present invention is to enable a card reader for an ATM card or a credit card to read information recorded on a mini card by mounting the mini card onto the adapter.

BACKGROUND ART

Adapters designed for mounting a small IC memory device are known (refer to Patent Documents 1 and 2). The adapter of Patent Document 1 has the same external dimensions as an ATM card, a credit card, or other commonly used internationally standardized cards (hereinafter referred to as "a standard card"). The adapter has a recess for fitting/mounting a small IC memory device in a designated location. Projections for engaging and holding the small IC memory device is formed on the inner edge of the recess in a circular manner. The IC memory device to be mounted comprises a memory main body shaped as a polygon with five corners obtained by cutting off a corner of a tetragon, an IC module embedded in the memory main body, input/output contact terminals disposed on a surface of the memory main body, and the like. Its surface area is slightly more than 13% of the surface area of the adapter main body. The standard card is specified in JISX6301.

In principle, the same basic configuration is adopted in the adapter of Patent Document 2. However, this configuration is different in that a storage recess for loading a small memory device is open on the top surface and peripheral side surface of the memory main body, and the memory device is insertably mounted in the storage recess from the side of the lateral opening. The total thickness of the adapter is therefore considerable when the memory device is mounted in the adapter.

Patent Document 1: Japanese Patent Laid-open Publication No. 10-272872 (Paragraph 0011, FIG. 1)
Patent Document 2: Japanese Patent Laid-open Publication No. 2002-190004 (Paragraph 0017, FIG. 1)

DISCLOSURE OF THE INVENTION

Problems to be Solved by the Invention

According to the adapter of Patent Document 1, the content of a small IC memory device can be read by a card reader for a standard card by the insertable mounting of the IC memory device into the recess of the adapter. Content can be also written as required.

However, a method is used in this case in which the IC memory device is insertably mounted in the recess formed on one side of the adapter. Therefore, there is a risk of serious failure arising from the IC memory device being caught in or falling out from the recess when the adapter is pulled into (loaded onto) the card reader apparatus in cases in which the condition of being mounted into the recess is incomplete, such as when a portion of the periphery of the IC memory device is protruding from the opening edge of the recess.

The memory device mounted in the recess is securely engaged and held by projections provided to the recess. However, the mounting is difficult to accomplish because the projections are provided in a circular manner along the inner periphery of the recess. Removing the IC memory device from the recess is even more difficult. There is also a disadvantage in that the adapter may undergo bending deformation as a result of the opposing projections being pushed away by the IC memory device mounted in the recess. The IC memory device can fall out more easily from the recess when an attempt is made to avoid the bending deformation.

The mini card that is the object of the present invention is assumed to have the same thickness as the standard card. Therefore, the mini card inevitably protrudes from the recess by an amount of the thickness of the bottom wall of the recess, and there is a risk that the card reader may not be able to accept the adapter when a method is adopted in which the mini card is insertably mounted in the recess formed in the adapter as described above.

The extent to which the card protrudes from the recess may be reduced to a negligible value by minimizing the thickness of the bottom wall of the recess. However, a new problem arises because of the fact that the surface area of the mini card is equal to or greater than half (approximately 57%) of the surface area of the standard card. It is predicted that when the recess for accommodating the mini card is formed in the adapter, the entire adapter can bend more easily and undergo deformation more easily due to lack of strength. Furthermore, it is difficult to fixedly hold the mini card securely and firmly in the recess. Another disadvantage is that the bottom wall of the recess becomes easy to break.

An object of the invention is to provide a mini card adapter that can fixedly hold a mini card having the same thickness as a standard card in a secure manner and allows the mini card to be mounted and dismounted with ease. Another object of the present invention is to provide a mini card adapter that solves the problem of bending or deformation in the adapter while securely preventing a portion of the mounted mini card from protruding from the mounting portion, and that allows the card to be loaded into a card reader as smoothly as a standard card.

Yet another object of the present invention is to provide a mini card adapter having a periphery holding structure that engages and holds a plurality of locations along the periphery of the mini card in a direction of the thickness of the card, and that restricts free movement of the mini card by using a hole provided in the card surface.

Means Used to Solve the Above-Mentioned Problems

A region in which the unique card number, the cardholder's name, the expiration date, and the like can be formed as embossed characters (hereinafter referred to as "the embossed region") is defined on a standard card. A margin commensurate with the bulging of the embossed region from the card surface is provided in the loading slot of a card reader. The inventors made the present invention upon discovering that a mini card having the same thickness as a standard card can be securely fixed and held in place by utilizing the thickness of the embossed region.

The mini card adapter of the invention is used to hold a mini card 1 which has the same thickness as a standard card but smaller external dimensions than the standard card, and to load the card in a card reader for standard cards. The mini card adapter is provided with a reference wall 8 having the same thickness as a standard card, and a land section 9 formed in a bulging manner on the top surface of the reference wall 8.

A card pocket 10 extending along at least two adjoining sides of the mini card 1 is formed in the reference wall 8. The land section 9 is formed within a zone Z that corresponds to the embossed region of the standard card, and at least a portion thereof extends toward the card pocket 10 and constitutes an eaves wall 15. An engaging piece 16 for fitting into a hole 3 provided in the mini card 1 protrudes from the eaves wall 15 that faces the card pocket 10. A receiving nail 17 for receiving the periphery of the mini card 1 in cooperation with the eaves wall 15 is formed on the bottom surface of the periphery of the card pocket 10.

The card pocket 10 formed by cutting off the two adjoining sides of the reference wall 8 is defined by a first side 11 having the same length as a long side of the mini card 1, and a second side 12 having the same length as a short side of the mini card 1. The land section 9 is formed along the entire length of the reference wall 8 that includes the first side 11.

The rib-shaped receiving nail 17 for receiving the periphery of the mini card 1 is formed in a protruding manner both on the first side 11 and on the second side 12. The receiving nail 17 is provided with a nail bottom surface 17a which is level with the bottom surface of the reference wall 8, and a nail top surface 17b which is inclined upward in the direction away from the distal end of the receiving nail 17 toward the protruding base end.

The land section 9 can be formed across the entire width of the zone Z that corresponds to the embossed region of the standard card.

The mini card adapter of the invention is an adapter for holding a mini card 1 having the same thickness as a standard card but smaller external dimensions than the standard card, and loading the mini card into a card reader for standard cards, the mini card adapter comprising a reference wall 8 having the same thickness as the standard card, and a land section 9 formed in a bulging manner on a top surface of the reference wall 8; wherein the mini card adapter is characterized in that a card pocket 10 extending along at least two adjoining sides of the mini card 1 is formed in the reference wall 8; wherein the land section 9 is formed within a zone Z that corresponds to an embossed region of the standard card, and at least a portion thereof overhangs toward the card pocket 10 and constitutes an eaves wall 15; wherein an engaging piece 16 for fitting into a hole 3 provided in the mini card 1 protrudes from the eaves wall 15 that faces the card pocket 10; and wherein a re-peelable weak adhesive layer 20 capable of repeating bonding and peeling is formed on the eaves wall 15 that faces the card pocket 10.

EFFECT OF THE INVENTION

In the mini card adapter of the present invention, a card pocket 10 for mounting a mini card 1 in a reference wall 8 having the same thickness as a standard card is formed, and an eaves wall 15 extending toward the card pocket 10 in formed by forming a land section 9 in a bulging manner on the top surface of the reference wall 8. Based on this, a arrangement is adopted in which an engaging piece 16 provided in the eaves wall 15 is fitted into a hole 3 in the mini card 1 to restrict the movement of the mini card 1 in the planar directions of the card, and the card surface of the mini card 1 along the periphery thereof is received by the eaves wall 15. Another feature of this arrangement is that a receiving nail 17 is provided to the bottom surface of the card pocket 10 along the periphery, the periphery of the mini card 1 can be received both by the eaves wall 15 and by the receiving nail 17, and the separation of the mini card 1 from the eaves wall 15 can be restricted.

In other words, free movement of the mini card 1 is restricted by using the hole 3 provided in the card surface, and a plurality of locations along the periphery of the mini card 1 are engaged and held by the eaves wall 15 and the receiving nail 17 in the thickness direction of the card. Accordingly, the mini card 1 mounted in the card pocket 10 can be held in a secure manner, and the mounting of the mini card 1 is simplified compared to conventional methods in which an IC memory device is inserted into a recess. The mini card 1 can also be easily separated from the card pocket 10 by grasping the exposed portion of the mini card 1 adjacent to the reference wall 8.

The land section 9 is formed in a bulging manner within a zone Z that corresponds to the embossed region of the standard card. Therefore, the adapter with the mounted mini card 1 can be easily inserted and loaded into a loading slot of a card reader for standard cards. This is because a margin that corresponds to the embossed region of the standard card is provided in the card reader, and the land section 9 can travel back and forth within the above-mentioned margin.

When the card pocket 10 is defined by the first side 11 having the same length as the long side of the mini card 1 and the second side 12 having the same length as the short side of the mini card 1, the outline of the card adapter in the state in which the mini card 1 is mounted in the card pocket 10 can substantially match the external shape of a standard card. Therefore, the adapter can be easily inserted into the loading slot of the card reader. When the land section 9 is formed along the entire length of the reference wall 8 that includes the first side 11, the thickness of the land section 9 adds to the structural strength of the reference wall 8 in proportion to the added thickness of the land section 9. Especially, the bending strength of the card surface that includes the first side 11 can be increased.

When the rib-shaped receiving nail 17 for receiving the periphery of the mini card 1 is formed in a protruding manner on both the first side 11 and the second side 12, the rib-shaped receiving nail 17 engages and supports two adjoining sides of the mini card 1, and the mini card 1 mounted in the card pocket 10 can be fixed and held in place more securely. When the nail top surface 17b that is inclined upward away from the distal end toward the protruding base end is formed in the receiving nail 17, the periphery of the mini card 1 can be guided in by the nail top surface 17b so that the mini card 1 can be mounted in the card pocket 10 more easily. The card periphery can be securely engaged and held in place even if the thickness of the mini card 1 is nonuniform. This is because the periphery of the mini card 1 is received by the nail top surface 17b inclined at a slant.

When the land section 9 is formed across the entire width of the zone Z that corresponds to the embossed region of a standard card, the reference wall 8 is reinforced by the land section 9, and the structural strength of the card adapter provided with the large-surface card pocket 10 increases and the rigidity improves.

When the weak adhesive layer 20 is formed on the eaves wall 15 that faces the card pocket 10, the state in which the mini card 1 is mounted in the card pocket 10 can be maintained by the adhesion of the weak adhesive layer 20 in addition to the holding action of the eaves wall 15, the engaging piece 16, and the receiving nail 17 so that the mini card 1 can be fixed and held more firmly.

According to the mini card adapter recited in claim 6, a mini card 1 can be quickly and easily mounted in or dismounted from the card adapter by using a weak adhesive layer 20 formed on an eaves wall 15.

DESCRIPTION OF THE REFERENCE NUMERALS

1: Mini Card
3: Hole
8: Reference Wall
9: Land section
10: Card Pocket
11: First Side
12: Second Side
15: Eaves Wall
16: Engaging Piece
17: Receiving Nail

BEST MODE FOR CARRYING OUT THE INVENTION

Figure 1:
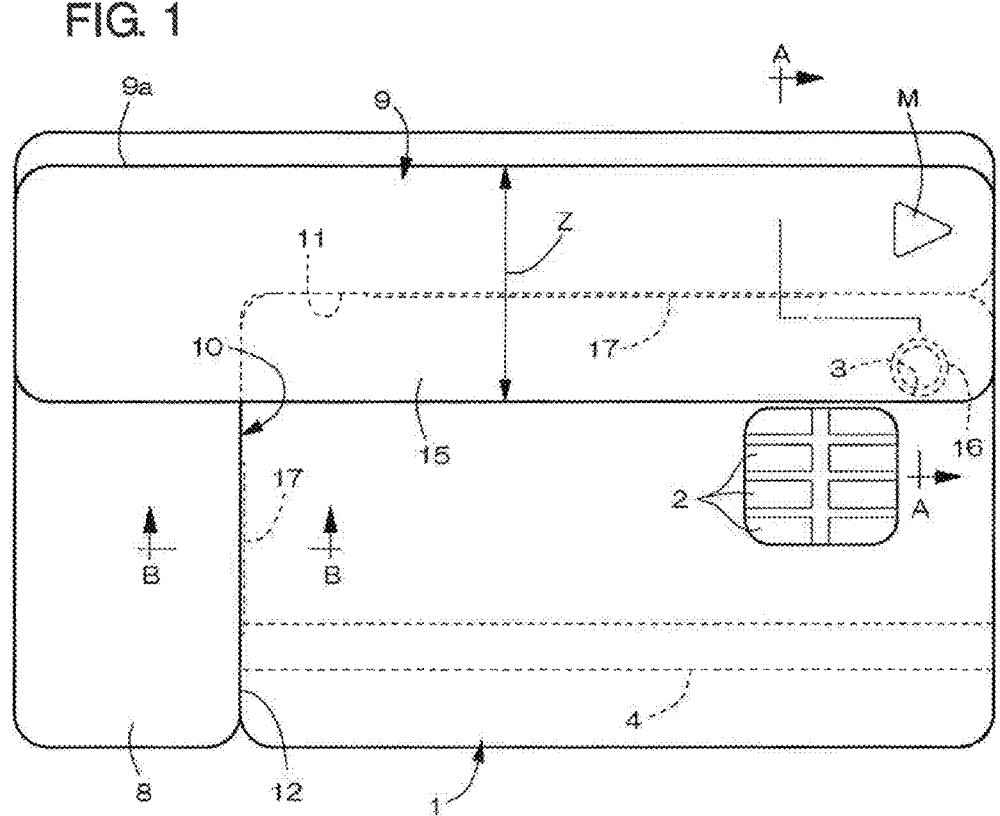
FIG. 1 is a plan view of a mini card adapter in a state in which a mini card is mounted.
Figure 2:
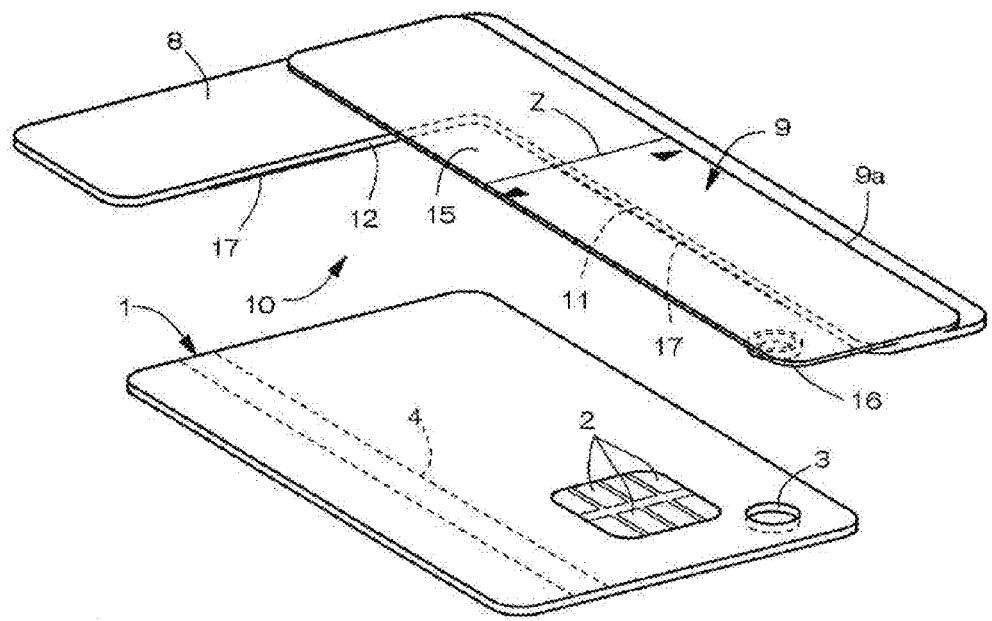
FIG. 2 is an exploded perspective view of the mini card and the mini card adapter.

FIGS. 1 to 5 show an example of a mini card adapter according to the present invention. In FIG. 2, the mini card 1 to be mounted has the same thickness as a standard card, and smaller external dimensions than the standard card. Specifically, the mini card is formed in a rectangular shape having a long side of 66 mm, and a short side of 40 mm and four rounded corners.

An IC chip (not shown) is embedded in the mini card 1, and input/output contact terminals 2 are exposed from one side of the top surface. A circular hole 3 for connecting to a key ring is formed through a corner portion in proximity to the contact terminals 2. A magnetic stripe 4 is formed on the bottom surface of the card.

In FIGS. 1 and 2, the mini card adapter is an injection molded article that is made of a hard plastic and comprises an L-shaped, as seen in plan view, reference wall 8 having the same thickness as a standard card, and a land section 9 formed in a bulging manner on a top surface of the reference wall 8. The wall and the land section are integrated with each other. A card pocket 10 for accommodating the mini card 1 is formed in the reference wall 8.

The card pocket 10 is formed by cutting off two adjoining sides of the reference wall 8. The card pocket 10 comprises a first side 11 having the same length as a long side of the mini card 1 and a second side 12 having the same length as a short side of the mini card 1. The plan view of the mini card adapter that includes the mini card 1 mounted in the card pocket 10 has substantially the same shape and size as the plan view of the standard card.

The land section 9 is formed within a zone Z that corresponds to an embossed region of a standard card. More specifically, the embossed region of the standard card is formed in one half of the card surface in the direction (shown by arrow M in FIG. 1) in which the card is inserted into the card reader. The land section 9 is formed in a bulging manner in a transversely extending rectangular shape while occupying the entire zone Z in the same location and at the same width as the embossed region.

The land section 9 is formed along the entire longitudinal length of the reference wall 8 that includes the first side 11 in order to reinforce the reference wall 8. The bulging of the land section 9 is equal to or is slightly less than the protrusion height of the embossed characters formed in the embossed region of the standard card. In this example, when the thickness of the reference wall 8 is 0.87 mm, the extent to which the land section 9 bulges from the reference wall 8 is set to be 0.43 mm. A stepped part 9a is formed along the long side of the reference wall 8 on one side of the land section 9. The term "stepped part 9a" merely refers to one of the borders of the embossed region.

As described above, the land section 9 is formed so as to occupy the entire zone Z, and the long side thereof extends from the first side 11 toward the card pocket 10 to form an eaves wall 15. This eaves wall 15 serves to receive one side of the top surface of the mini card 1 mounted in the card pocket 10 and to position the mini card 10 in a thickness direction. In order to securely hold and fix the mini card 1 mounted in the card pocket 10, the first side 11, the second side 12, and the eaves wall 15 have a card capturing structure.

As described above, the hole 3 for attaching a key ring is formed in the mini card 1. A boss (an engaging piece) 16 that fits into the hole 3 and restricts the free movement of the mini card 1 in the planar directions of the card protrudes downward from the eaves wall 15 that faces the card pocket 10. The hole 3 and the boss 16 can mate with and part from each other. The diameters of these are set so that these are held steady against each other. The extent to which the boss 16 protrudes from the eaves wall 15 is set to 0.87 mm.

Figure 3:
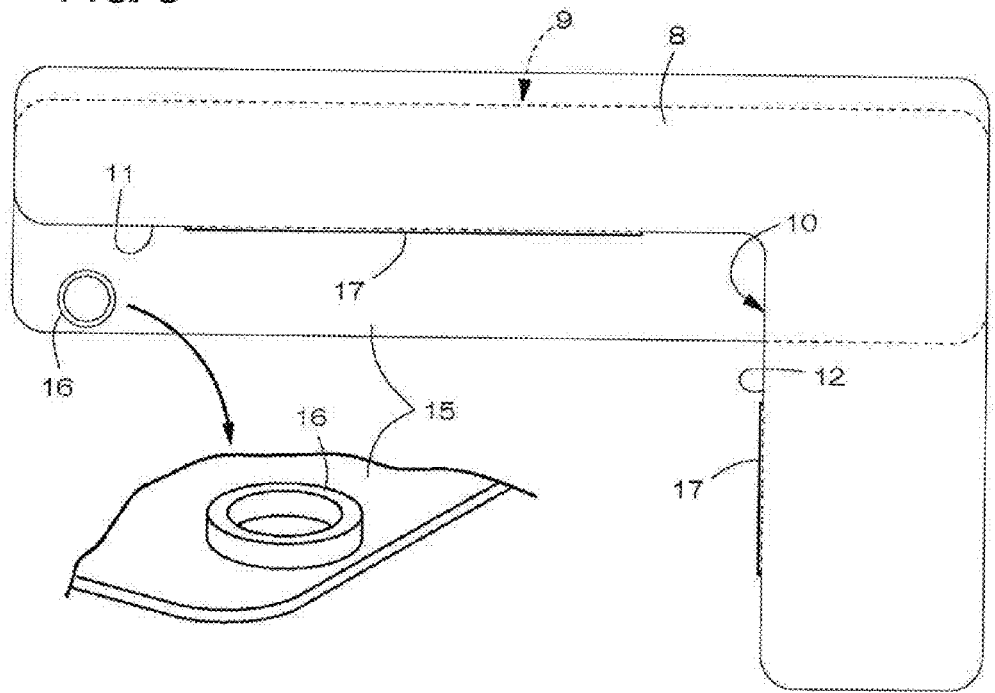
FIG. 3 is a bottom view of the mini card adapter.

As a card capturing structure that is different from the boss 16, a receiving nail 17 for receiving the periphery of the mini card 1 in cooperation with the eaves wall 15 is formed on the bottom surface of the periphery of the card pocket 10. Specifically, long rib-shaped receiving nails 17, 17 for receiving the periphery of the mini card 1 are formed in a protruding manner in the middle parts of the first side 11 and the second side 12 of the card pocket 10, as shown in FIG. 3.

Figure 4:
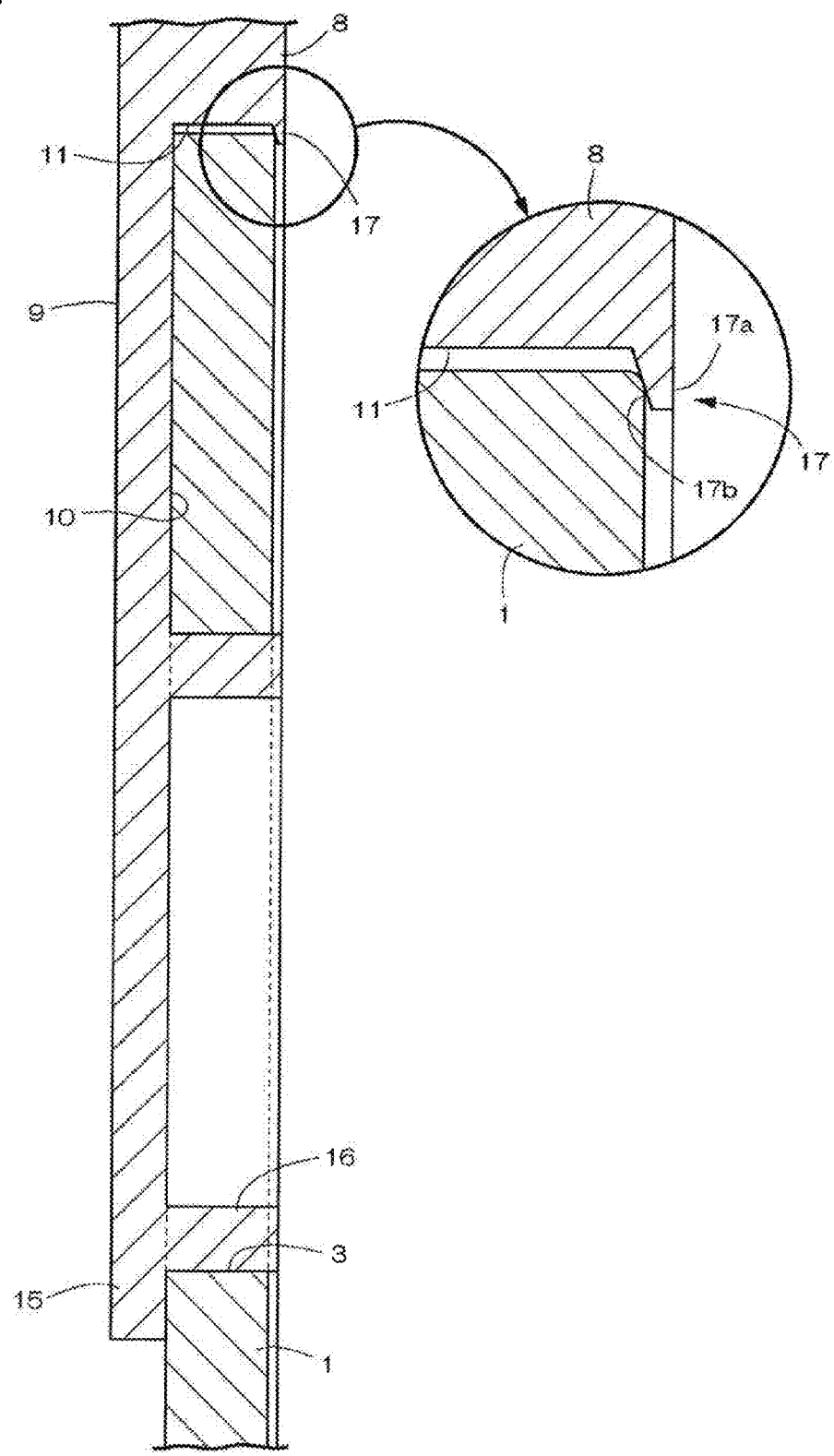
FIG. 4 is a sectional view along line A-A in FIG. 1.
Figure 5:
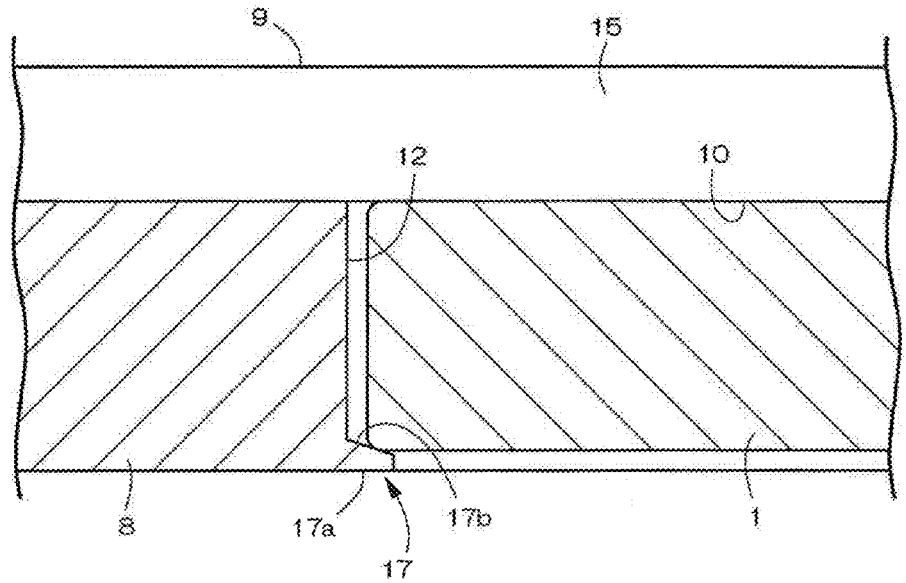
FIG. 5 is a sectional view along line B-B in FIG. 1.

As shown in FIGS. 4 and 5, each of the receiving nails 17 comprises a nail bottom surface 17a which is level with the bottom surface of the reference wall 8 and a nail top surface 17b which is inclined upward from the distal end to the base of the receiving nail 17 toward the protruding base end. The nail top surface 17b holds the periphery of the mini card 1 and prevents the long side and the short side of the mini card 1 from escaping from the card pocket 10 in the thickness direction of the card.

When the nail top surface 17b is formed as a slanted surface upwardly inclined toward the protruding base end, the receiving nail 17 can securely engage and capture the periphery of the mini card even if there is a slight variance in the thickness of the mini card 1. The receiving nail 17 that has engaged and captured the periphery of the mini card 1 undergoes slight elastic deformation toward the nail bottom surface 17a. However, the extent of the deformation is within the thickness tolerance of the standard card.

When the mini card 1 is mounted in the card adapter, the entire card adapter is turned upside down; the long side of the mini card 1, which is similarly turned upside down, is aligned with the first side 11 of the card pocket 10; the boss 16 is fitted into the hole 3; and the periphery of the card is inserted between the eaves wall 15 and the receiving nail 17.

Furthermore, the short side of the mini card 1 is aligned with the second side 21, pushed to ride over the receiving nail 17 of the second side 12, and caused to engage with the receiving nail 17. In this mounted state, the contact terminals 2 are exposed further outside beyond the distal end of the eaves wall 15, allowing information signals to be easily exchanged with the card reader.

Some card readers read recorded signals on the magnetic stripe 4. A procedure that is the reverse of the above-described procedure is followed when the mini card 1 is removed from the card pocket 10. In this case, the mini card 1 can be easily separated by twisting the outer periphery of the mini card 1 and releasing the card from the receiving nail 17 of the second side 12.

In the mounted state of the card as described above, the long side and the short side of the mini card 1 are each held by the eaves wall 15 and the receiving nails 17, and the free movement of the mini card in the thickness direction is restricted. The free movement of the mini card in the planar directions of the card is also restricted by the boss 16. As a result, the mini card 1 does not fall out from the card pocket 10. Inserting the card adapter in this state into the loading slot of the card reader for standard cards allows information signals stored on the mini card 1 to be read or written.

The card adapter of the present example is thus characterized in that the mini card 1 mounted in the card pocket 10 is engaged and held by the boss 16 and the periphery of the card is held and fixed by the eaves wall 15 and the receiving nails 17.

In FIGS. 4 and 5, the long and short sides of the mini card 1 mounted in the card pocket 10 are received along the peripheries thereof by the intermediate part of the nail top surface 17b of the receiving nail 17, with a small gap from the first side 11 and the second side 12. In other words, the long and short sides of the mini card 1 along the outer periphery protrude from the outer edge of the reference wall 8 adjacent to the card pocket 10 by a dimension commensurate with the aforementioned gaps. However, these protrusions are within the tolerances of the external dimensions of the standard card. Therefore, the card adapter in which the mini card 1 is mounted can be easily inserted and loaded into the loading slot of the card reader.

Figure 6:
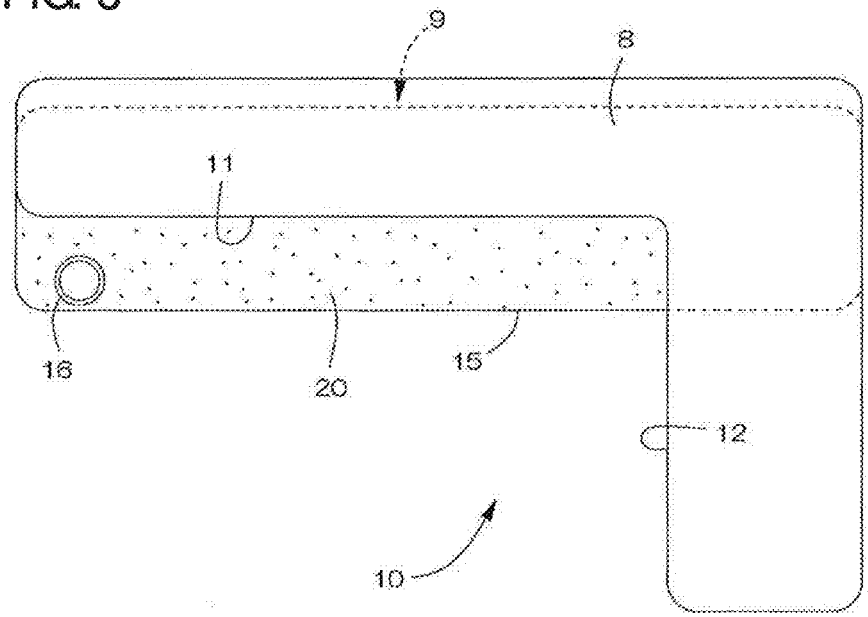
FIG. 6 is a bottom view of another example of the mini card adapter.

FIG. 6 shows another example related to the card adapter of the invention. In this example, the receiving nails 17 in the above-described example are omitted, and a re-peelable weak adhesive layer 20 is instead formed on the bottom surface of the eaves wall 15. The weak adhesive is composed of a urethane adhesive, for example, and the weak adhesive allows repetitive bonding and peeling. When the receiving nails 17 are thus omitted, the mini card 1 can be easily mounted in the card pocket 10 merely by pressing the card surface against the weak adhesive layer 20 while the hole 3 is engaged with the boss 16 and its long side is aligned with the first side 11 of the card pocket 10. The mini card 1 can be also easily removed.

When the mini card 1 is mounted in the card pocket 10, the long and short sides thereof are each bonded to the first side 11 and the second side 12. Such bonding makes it possible to prevent situations in which the long and short sides of the mini card 1 along the outer periphery extend from an imaginary outer edge of the cut-off long and short sides of the reference wall 8, and allows the outline of the card adapter that includes the mini card 1 to match the outline of a standard card. Because other aspects are the same as in the foregoing example, the same numerical symbols are assigned to the same components, and a description thereof is omitted. The same applies to the following examples.

Figure 7:
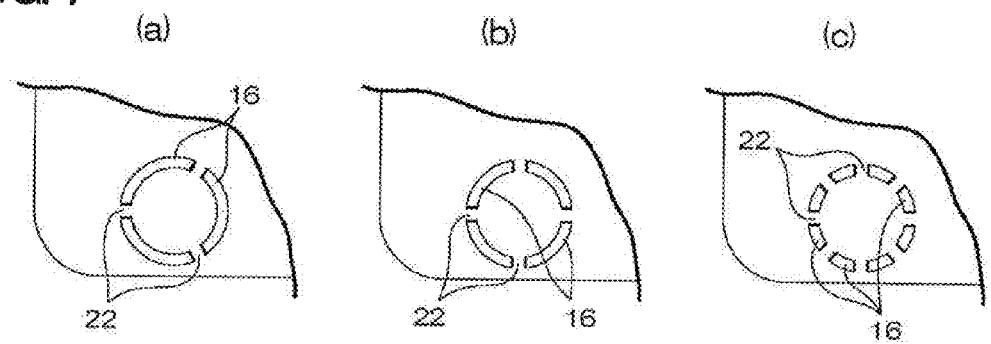
FIG. 7 is a partial bottom view of the boss of another example.

FIGS. 7(a) to 7(c) show other examples related to the boss 16. In FIG. 7(a), the boss 16 is divided by three slits 22 disposed at regular intervals. Each of the divided cylindrical walls can elastically deform in the radial direction toward the center. When the divided walls are capable of elastic deformation in this fashion, the elasticity of the partial cylindrical walls allows the hole 3 to be engaged and held steady in a state in which the boss 16 is fitted into the circular hole 3. Similarly, the boss 16 is divided by four slits 22 disposed at regular intervals in FIG. 7(b), and the boss 16 is divided by eight slits 22 disposed at regular intervals in FIG. 7(c).

In addition to the examples described above, a weak adhesive layer 20 similar to FIG. 6 can be formed on the bottom surface of the eaves wall 15 of the mini card adapter described with reference to FIGS. 1 to 5 so that the mini card 1 can be fixed and held more securely. In the above example, two adjoining sides of the reference wall 8 are cut off to form the card pocket 10, but it is also possible to cut off the reference wall 8 in a U shape to form the card pocket 10, for example.

The land section 9 does not have to be formed across the entire width of the zone Z that corresponds to the embossed region of the standard card as long as the section 9 is formed in an area which covers at least the eaves wall 15 and the first side 11. In other words, the outline of the land section 9 does not have to be rectangular as long as the section 9 includes at least the eaves wall 15 in the zone Z that corresponds to the embossed region.

The receiving nail 17 does not have to have a continued rib shape, and a plurality of nails can be disposed in a linear sequence. The first side 11 of the card pocket 10 can be made shorter than the long side of the mini card 1. The engaging piece 16 does not have to be a cylindrical boss and may be a projection that can fit into the hole 3.

The invention claimed is:

1. A mini card adapter for holding a mini card that has the same thickness as a standard card and smaller external dimensions than the standard card and loading the mini card into a card reader for standard cards, said mini card adapter comprising:
   a reference wall having the same thickness as the standard card and a land section formed in a protruding manner on a top surface of the reference wall,
   wherein said mini card adapter is characterized in that:
   a card pocket extending along at least two adjoining sides of the mini card is formed in the reference wall;
   the land section is formed within a zone Z that corresponds to an embossed region of the standard card, and at least a portion thereof extends toward the card pocket to form an eaves wall;
   an engaging piece for fitting into a hole is provided in the mini card protrudes from the eaves wall, which faces the card pocket; and
   a receiving nail for receiving the periphery of the mini card in cooperation with the eaves wall is formed on the bottom surface along the periphery of the card pocket.

2. The mini card adapter according to claim 1, wherein:
   the card pocket formed by cutting off two adjoining sides of the reference wall is defined by a first side having the same length as a long side of the mini card and a second side having the same length as a short side of the mini card; and
   the land section is formed along the entire length of the reference wall that includes the first side.

3. The mini card adapter according to claim 2, wherein:
   a rib-shaped receiving nail for receiving the periphery of the mini card is formed in a protruding manner in both the first side and the second side; and
   the receiving nail comprises a nail bottom surface which is level with the bottom surface of the reference wall, and a nail top surface which is inclined upward from the distal end of the receiving nail to the protruding base end thereof.

4. The mini card adapter according to claim 1, wherein the land section is formed across the entire width of the zone that corresponds to the embossed region of a standard card.

5. The mini card adapter according to claim 1, wherein a re-peelable weak adhesive layer capable of repeating bonding and peeling is formed on the eaves wall that faces the card pocket.

6. A mini card adapter for holding a mini card that has the same thickness as a standard card and smaller external dimensions than the standard card and loading the mini card into a card reader for standard cards, said mini card adapter comprising:

a reference wall having the same thickness as the standard card and a land section formed in a protruding manner on a top surface of the reference wall, wherein said mini card adapter is characterized in that:

a card pocket extending along at least two adjoining sides of the mini card is formed in the reference wall;

the land section is formed within a zone that corresponds to an embossed region of the standard card, and at least a portion thereof extends toward the card pocket to form an eaves wall;

an engaging piece for fitting into a hole provided to the mini card protrudes from the eaves wall, which faces the card pocket; and a re-peelable weak adhesive layer capable of repeating bonding and peeling is formed on the eaves wall that faces the card pocket.

* * * * *